United States Patent [19]

Nicholas

[11] Patent Number: 5,201,884
[45] Date of Patent: Apr. 13, 1993

[54] AQUATIC LOCATOR APPARATUS

[76] Inventor: Mike W. Nicholas, 2000 E. Evanston, Wichita, Kans. 67219

[21] Appl. No.: 806,885

[22] Filed: Dec. 12, 1991

[51] Int. Cl.⁵ ............................................. A01K 97/00
[52] U.S. Cl. .................................................... 43/26.1
[58] Field of Search ................... 43/26.1, 17.1; 367/93, 367/96, 107, 108, 109, 910

[56] References Cited

U.S. PATENT DOCUMENTS

| | | | |
|---|---|---|---|
| 4,161,077 | 7/1979 | Ciaccio | 43/26.1 |
| 4,442,621 | 4/1984 | Kent . | |
| 4,538,249 | 8/1985 | Richard . | |
| 4,697,371 | 10/1987 | Hill . | |
| 4,757,481 | 7/1988 | Orr | 367/96 |
| 4,757,633 | 7/1988 | Van Cleve | 43/26.1 |
| 4,805,337 | 2/1989 | Kurata . | |
| 4,856,222 | 8/1989 | Hannam . | |
| 4,979,153 | 12/1990 | Terry | 43/17.1 |
| 4,995,009 | 2/1991 | Altmire et al. . | |
| 5,016,385 | 5/1991 | Blease | 43/26.1 |

*Primary Examiner*—Kurt C. Rowan
*Attorney, Agent, or Firm*—Litman, McMahon & Brown

[57] ABSTRACT

An improved remote-controlled, aquatic locator apparatus includes a base unit comprising detector controls, steering controls, and propulsion controls; and a mobile unit comprising a transducer, a steering mechanism, and a propulsion mechanism. The detector, steering and propulsion controls communicate with the transducer and the steering and propulsion mechanisms, respectively, by a buoyant multiconductor cable connecting the base unit to the mobile unit. A first modified apparatus includes two transducers, one directed generally downwardly and the other directed generally laterally to simultaneously provide different views. A second modified apparatus provides a base unit and a mobile unit which communicate wirelessly by a pair of transceivers, one in the base unit and the other in the mobile unit. A third modified apparatus includes an extendable rod for maneuvering a mobile unit toward and away from a base unit near a user.

14 Claims, 2 Drawing Sheets

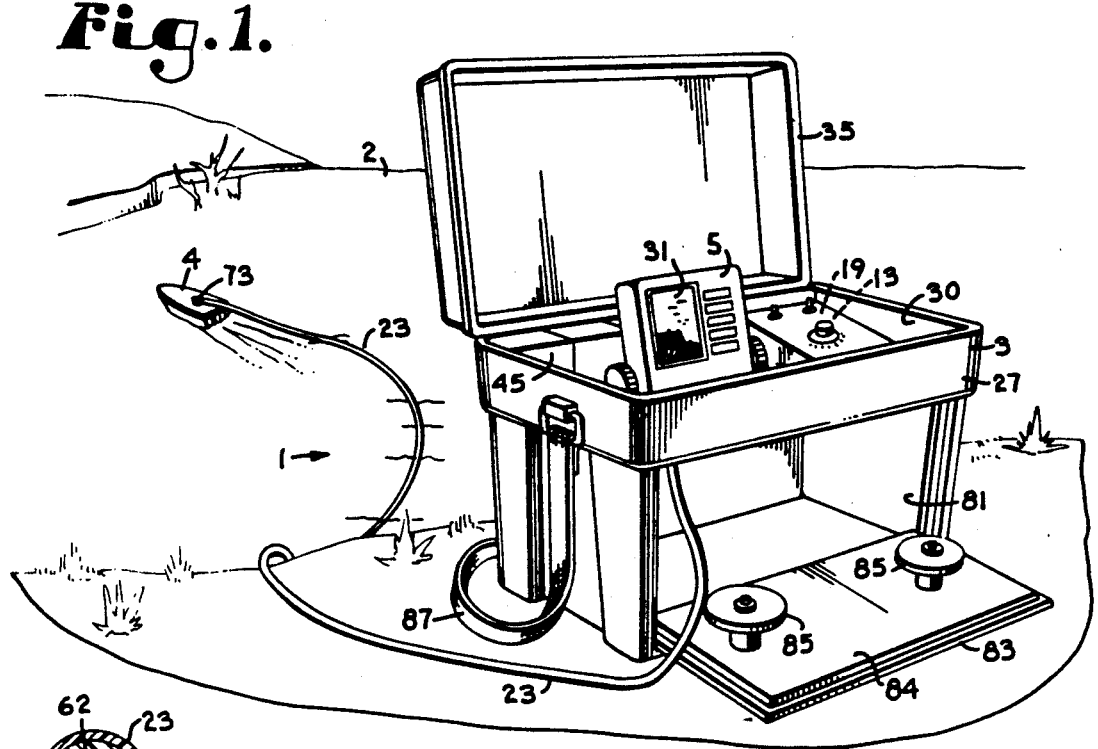
Fig.1.
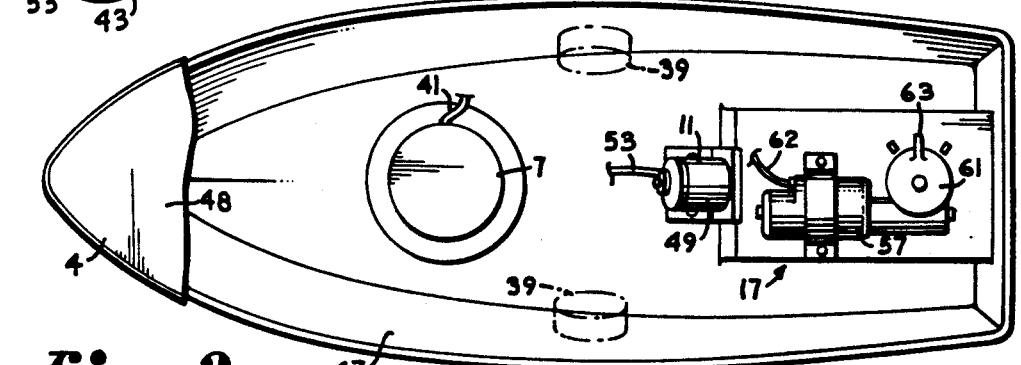
Fig.4.
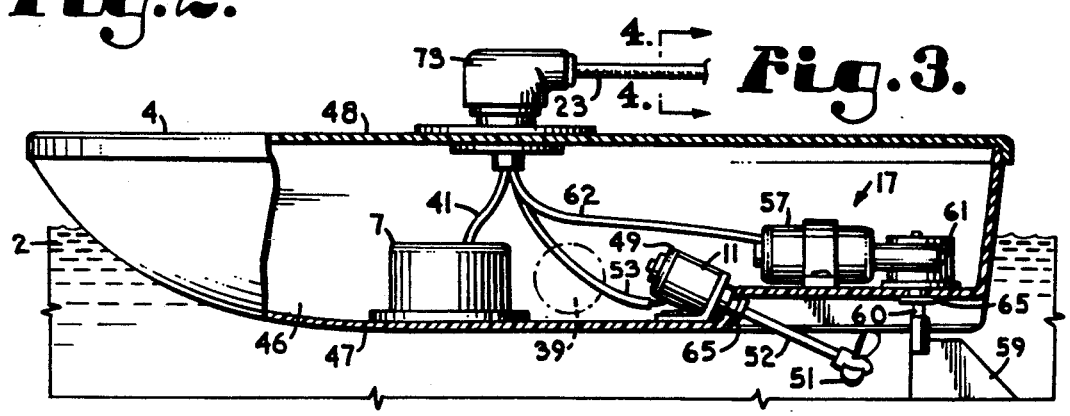
Fig.2.
Fig.3.

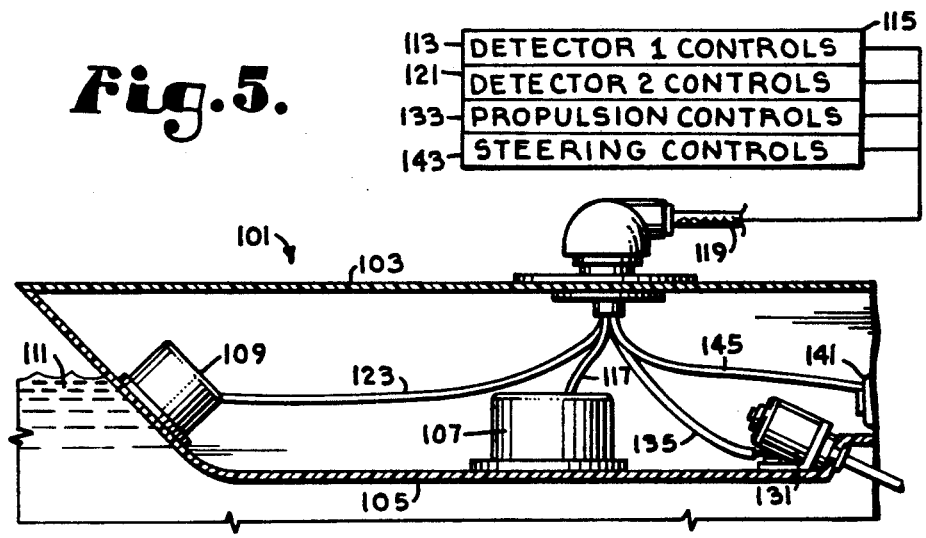
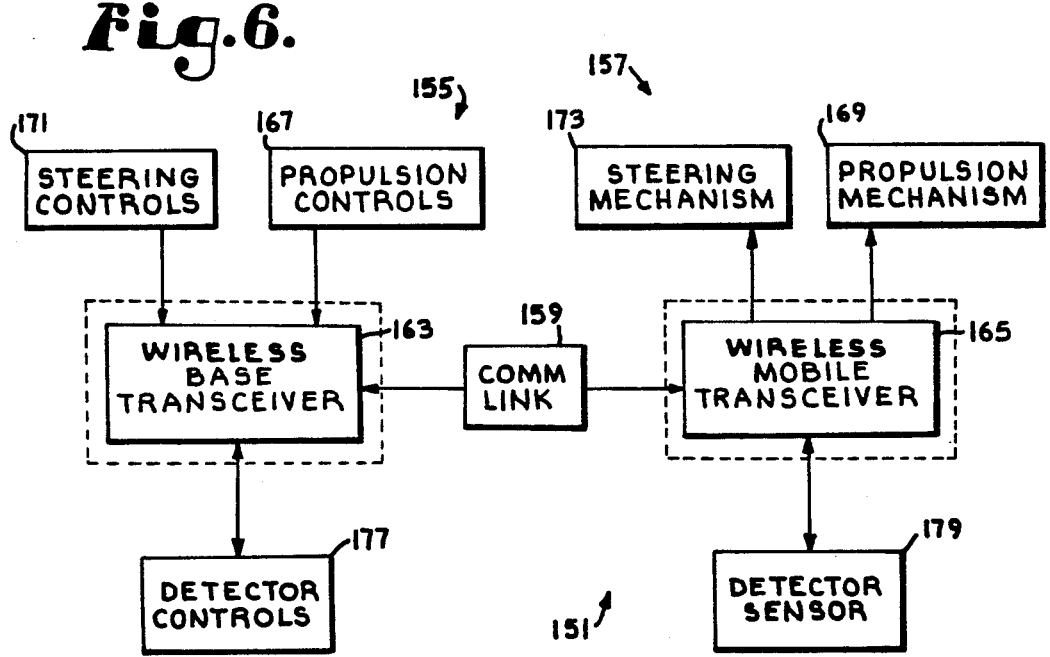
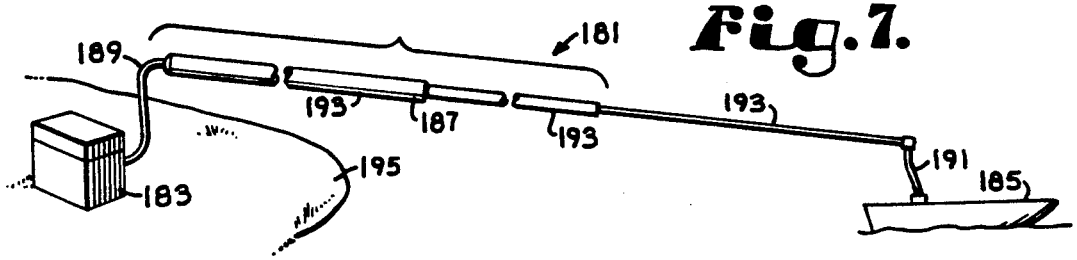

AQUATIC LOCATOR APPARATUS

BACKGROUND OF THE INVENTION

1. Field of the Invention

The present invention relates to an apparatus for locating marine objects and, particularly without limitation, to such an apparatus for locating fish by remote control.

2. Description of the Related Art

The use of fish detectors to locate prospective fishing sites is well known in the art and such devices are readily available. In order to utilize such a device, a user generally requires the use of a boat. To determine whether a particular site provides promising fishing prospects, a transducer of the fishing detector is placed in the water generally above the site and a monitor on the detector is observed to determine whether fish are located therebelow in the vicinity of the boat. If such an observation produces negative results, then the user often must move the boat in order to examine another potential fishing site with the device. Such a procedure may have to be repeated until a site is selected, even though the various sites may be within casting distance of the original site so examined.

Further, certain obstructions in the water may provide a situation whereby it would be inadvisable to maneuver a boat directly over a desired fishing site. In that event, the use of a fish detector as described would probably be foreclosed as the angler would generally be unable to use his or her detector but, instead, would have to proceed without the benefit of his or her investment in the fish detecting device.

Another complicating factor is that some anglers, from time to time, do not have the benefit of a boat and are shorebound. As a result, their fishing detectors are generally useless under those circumstances and, if they desire to fish, they must proceed without the use of such devices.

What is needed is a device whereby an angler in a boat can use a fish locating apparatus to survey the water within casting distance of his or her boat for potential fishing sites without having to constantly move the boat to examine different potential sites within that casting area. What is also needed is a fish locating apparatus which allows an angler to locate fish in an area wherein it would be inadvisable to actually maneuver a boat in order to utilize a conventional fish detecting apparatus. Also, what is needed is a fish detector whereby an angler on a bank is not handicapped because he does not have access to a boat but, instead, can fully utilize the benefits provided by an investment in a fish locator.

SUMMARY OF THE INVENTION

An improved aquatic locator apparatus is provided for locating marine objects generally within casting distance of an angler either in a boat on a body of water or on a bank thereof. The apparatus includes a base unit and a mobile unit. The base unit contains fish detector controls, preferably such controls which are commercially available. The detector controls are connected to a transducer in the mobile unit by a flexible, buoyant, interconnecting cable.

Propulsion controls and steering controls are also contained in the base unit. The propulsion controls are connected via the cable to a propulsion mechanism contained in the mobile unit such that the mobile unit can be selectively propelled within the range permitted by the interconnecting cable. Also, the steering controls are similarly connected to a steering mechanism contained in the mobile unit such that the mobile unit can be selectively steered to starboard or to port as the mobile unit is being propelled by the propulsion mechanism.

The mobile unit comprises a floating miniature boat-type device having a water-tight cavity situated between a deck and a hull for containing the transducer and appropriate parts of the propulsion mechanism and the steering mechanism. The base unit includes a container for containing and providing access to the detector controls, the steering controls, the propulsion controls, and battery compartment. The container also has a compartment for storing the mobile unit and the interconnecting cable when the apparatus is not in use.

The propulsion mechanism and the steering mechanism each include a different electric motor which is powered by one or more batteries generally contained in the base unit. The motor of the steering mechanism is reversible such that the mobile unit can be steered to starboard or to port as the mobile unit is propelled by the propulsion mechanism. The steering mechanism includes a rudder and the propulsion mechanism includes a propeller spaced adjacently to the hull.

The transducer may be situated in the mobile unit such that it is directed generally downwardly. Alternatively, the transducer may be directed generally outwardly from the mobile unit to detect fish near the surface or under an overhanging obstacle, such as a dock.

A first modified aquatic locator apparatus is provided with a pair of transducers, either or both of which may be directed generally downwardly or generally outwardly from a mobile unit such that two different views are simultaneously observable by a user.

A second modified aquatic locator apparatus is provided with a base unit having detector controls, propulsion controls and steering controls and a mobile unit having a steering mechanism, a propulsion mechanism, and a transducer. The base unit also includes a base transceiver which communicates wirelessly with a mated, mobile transceiver in the mobile unit to provide linkage between the detector controls and the transducer, between the propulsion controls and the propulsion mechanism, and between the steering controls and the steering mechanism. Signals detected by the transducer are, in turn, transmitted from the mobile unit back to the base unit for viewing in a monitor of the detector controls.

A first power source is provided in the base unit for energizing the various components contained in the base unit, and a second power source is provided in the mobile unit for energizing the various components contained in the mobile unit.

A third modified aquatic locator apparatus is provided which includes an extendable rod for maneuvering a mobile unit toward and away from a base unit near a user.

PRINCIPAL OBJECTS AND ADVANTAGES OF THE INVENTION

Therefore, the principal objects and advantages of the present invention include: providing an aquatic locator apparatus for observing marine objects; providing such an apparatus which is remote-controlled; providing such an apparatus such that an angler in a boat can search for fish within casting distance of his boat without moving the boat; providing such an apparatus whereby an angler in a boat can search for fish in an area which is generally inaccessible to the boat; providing such an apparatus whereby an angler on a bank can search for fish without a boat; providing such an apparatus whereby an angler can search for fish under an overhanging object; providing such an apparatus which is self-contained and portable; and generally providing such a remote-controlled locator apparatus which is efficient and reliable, economical to manufacture, simple to maintain, and which generally performs the requirements of its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of an aquatic locator apparatus, showing a base unit connected to a mobile unit by a cable, according to the present invention.

FIG. 2 is an enlarged and fragmentary top plan view of the mobile unit of the aquatic locator apparatus, with portions cut away to reveal details thereof.

FIG. 3 is an enlarged and fragmentary side elevational view of the mobile unit of the aquatic locator apparatus, with portions cut away to reveal details thereof.

FIG. 4 is a further enlarged and cross-sectional view of the cable of the aquatic locator apparatus, taken generally along line 4—4 of FIG. 3.

FIG. 5 is a fragmentary, cross-sectional elevational view, showing portions thereof schematically, of a first modified embodiment of an aquatic locator apparatus, according to the present invention.

FIG. 6 is a schematic diagram of a second modified embodiment of an aquatic locator apparatus, according to the present invention.

FIG. 7 is a perspective view of a third modified embodiment of an aquatic locator apparatus, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to an aquatic or a remote-controlled fish locator apparatus for use in a body of water 2, in accordance with the present invention, as shown in FIGS. 1 through 4. The apparatus 1 comprises a base unit 3 and a mobile unit 4. The apparatus 1 further comprises a detector device such as detector controls 5 and a transducer 7, propulsion means such as a propulsion mechanism 11, and propulsion controls 13, steering means such as a steering mechanism 17 and steering controls 19, communication linkage such as a multi-conductor cable 23, and a container 27.

The detector controls 5, the propulsion controls 13, and the steering controls 19 are generally contained in an upper compartment 30 of the container 27 of the base unit 3. The mobile unit 4 generally includes the transducer 7, the propulsion mechanism 11, and the steering mechanism 17.

Preferably, the detector controls 5 are readily available as an "off-the-shelf" item and has user signaling means such as a monitor 31. The detector controls 5 are shown pivotally mounted in the upper Compartment 30 such that the detector controls 5 can be adjusted for optimal viewing of the monitor 31 by a user. The container 27 and the upper compartment 30 are generally configured such that contents of the upper compartment 30 are protectable by a lid 35 which is closable in a covering relationship to the upper compartment 30.

The transducer 7 is disposed in the mobile unit 4 such that signals transmitted by the transducer 7 are directed generally downwardly from the mobile unit 4. Alternatively, the transducer 7 can be installed in the mobile unit 4, as indicated by the dotted lines referenced by the numeral 39 in FIG. 2, such that the transducer 7 transmits signals generally laterally from the mobile unit 4 for detecting the presence of objects near the surface of the water 2, such as objects which are disposed under an overhanging obstruction, a dock, or the like. The transducer 7 is connected in electrical communication with the detector controls 5 by first conductors 41 of the cable 23, which has a waterproof sheath 43. Preferably, the first conductors 41 are configured as a coaxial cable.

A power source, such as one or more batteries 45, contained in the container 27 provides electrical energy for the detector controls 5 and other electrical components s contained in the container 27.

The mobile unit 4 generally has a water-tight cavity 46 contained between a hull 47 and a deck 48. The hull 47 is constructed of materials which are transparent to signals from the transducer 7.

The propulsion mechanism 11 includes a first electric motor 49 disposed in the cavity 46, a propeller 51 spaced adjacently to the hull 47, and a propeller shaft 52 penetrating the hull 47 and connecting the motor 49 to the propeller 51 such that the mobile unit 4 can be propelled along the surface of the water 2, as illustrated in FIG. 3. The motor 49 is connected in electrical communication with the propulsion controls 13 by second conductors of the cable 23 such that a user of the apparatus 1 can selectively and remotely activate the motor 49 by the propulsion controls 13.

The steering mechanism 17 includes a second electric motor 57 disposed in the cavity 46 and a rudder 59 spaced adjacently to the hull 47. The motor 57 is a reversible electric motor and is connected to the rudder 59 by a rudder shaft 60 and a gear arrangement 61. The motor 57 is connected in electrical communication with the steering controls 19 by third conductors 62 of the cable 23 such that a user of the apparatus 1 can selectively and remotely activate the motor 57 by the steering controls 19, and such that the motor 57, operated in one direction, causes the rudder 59 to be oriented whereby the mobile unit 4 is steered to starboard and the motor 57, operated in the opposite direction, causes the rudder 59 to be oriented whereby the mobile unit 4 is steered to port.

A limit switch arrangement 63 generally confines the travel of the rudder 59 to a limited range. Alternatively, the gear arrangement 61 can provide means for limiting the range of travel of the rudder 59 by techniques commonly known in the art. Grommets 65 are provided about the propeller shaft 52 and the rudder shaft 60 whereat they protrude through the hull 47 in order to maintain water tightness of the cavity 46.

The cable 23 has a lightweight filler 71, such as a foam-type material or other suitable buoyant substance, such that the cable 23 generally floats near the surface of the water 2. The cable 23 is sufficiently flexible such that movement of the mobile unit 4, as hereinafter described, is only minimally hindered by the cable 23.

The cable 23 is generally secured to the deck 48 by a swivel arrangement 73 in order to further minimize hindrance of the mobile unit 4 by the cable 23 as the mobile unit 4 is maneuvered into various positions for locating marine objects. The motors 49 and 57 and other elements of the apparatus 1 contained in the cavity 46 are arranged such that the mobile unit 4 is relatively balanced and has a low center of gravity.

The container 27 generally has a lower compartment 81, enclosable by a door 83 for storing the mobile unit 4 and the cable 23 therein when the apparatus 1 is not in use. A pair of spools 85 secured to an inside surface 84 of the door 83 is generally provided for winding the cable 23 thereon for storage. A shoulder strap 87 provides generally "hands-free" carrying of the apparatus 1 from one location to another.

In an application of the present invention, the apparatus 1 is placed in a boat (not shown) or on the bank beside a body of Water 2, as shown in FIG. 1. The mobile unit 4 and the cable 23 are removed from the lower compartment 81 and the mobile unit 4 is placed in the water.

After manipulating the detector controls 5 such that the detector controls 5 and the transducer 7 are functioning properly, the propulsion controls 13 and the steering controls 19 are manipulated such that the mobile unit 4 is remotely propelled and steered to a selected search site within reach of the cable 23. If, after examining the selected site, it is desired to search other sites within reach of the cable 23, it is a simple matter to further manipulate the propulsion controls 13 and the steering controls 19 to examine such sites.

A first modified aquatic or remote-controlled fish locator apparatus in accordance with the present invention is shown in FIG. 5 and is generally designated by the reference numeral 101. Many of the characteristics of the first modified apparatus 101 are substantially similar to those previously described for the apparatus 1 and will not be reiterated here in detail.

The first modified apparatus 101 includes a mobile unit 103 having a hull 105 constructed of materials which are transparent to signals from a first transducer 107 and a second transducer 109. The first transducer 107 is positioned such that signals therefrom are directed downwardly from the mobile unit 103 for detecting marine objects in water 111 generally below the mobile unit 103, and the second transducer 109 is positioned such that signals therefrom are directed generally outwardly for detecting marine objects near the surface of the water 111 and under overhanging structures such as a dock (not shown).

The first transducer 107 is connected in electrical communication with first detector controls 113 disposed in a base unit 115 by first conductors 117 of a buoyant, multiconductor cable 119. Similarly, the second transducer 109 is connected in electrical communication with second detector controls 121 by second conductors 123. As a result, the first transducer 107 and the second transducer 109 are simultaneously operable such that the information regarding marine objects spaced both downwardly from and outwardly from the mobile unit 103 are simultaneously observable.

It is foreseen that some applications may require that the first transducer 107 and the second transducer 109 may both be directed generally outwardly, or both be directed generally downwardly. It is also foreseen that some applications may require use of more than two transducers as described.

It is also foreseen that the first detector controls 113 and the second detector controls 121 may be combined into a single control unit which is switchable between the transducer 107 and the transducer 109 for individual monitoring, or is connectable to both for simultaneous monitoring thereof. It is also foreseen that a remotely controlled switching unit (not shown) could be disposed in the mobile unit 103 such that either the first conductors 117 or the second conductors 123 may be eliminated and, similarly, either the first detector controls 113 or the second detector controls 121 may be eliminated.

Also, a propulsion mechanism 131 is connected in electrical communication with propulsion controls 133 by third conductors 135, and a steering mechanism 141 is connected in electrical communication with steering controls 143 by fourth conductors 145.

A second modified aquatic or remote-controlled fish locator apparatus in accordance with the present invention is schematically shown in FIG. 6 and is generally designated by the reference numeral 151. Many of the characteristics of the second modified apparatus 151 are substantially similar to those previously described for other apparatus described herein and will not be reiterated here in detail.

The second modified apparatus 151 includes a base unit 155, a mobile unit 157, and a communication link 159 whereby the base unit 155 and the mobile unit 157 are able to intercommunicate. Communication by the communication link 159, such as by digitizing and de-digitizing, is commonly known in the art.

The base unit 155 includes a base transceiver 163 which communicates wirelessly with a mobile transceiver 165. Propulsion controls 167 communicates through the communication link 159 between the base transceiver 163 and the mobile transceiver 165 to operably activate a propulsion mechanism 169. Similarly, steering controls 171 communicate through the communication link 159 to operably activate a steering mechanism 173.

Detector controls 177 in the base unit 155 similarly communicate through the communication link 159 with a detector sensor or transducer 179 disposed in the mobile unit 157. By manipulating the propulsion controls 167 and the steering controls 171, the mobile unit 157 can be maneuvered anywhere within range serviced by the communication link 159 to detect the presence of marine objects.

It is foreseen that some applications may require both electrical communication and wireless communication between the base unit 155 and the mobile unit 157.

A third modified aquatic or remote-controlled fish locator apparatus in accordance with the present invention is shown in FIG. 7 and is generally designated by the reference numeral 181. Many of the characteristics of the third modified apparatus 181 are substantially similar to those previously described for other apparatus described herein and will not be reiterated here in detail.

The third modified apparatus 181 includes a base unit 183, a mobile unit 185, an extendable rod 187, and a communication link 189. The communication link 189 includes a multi-conductor, preferably coaxial, cable 191 which connects detector controls (not shown) contained in the base unit 183 with a transducer (not shown) contained in the mobile unit 185. The cable 191 is contained in a hollow axial cavity (not shown) running lengthwise through the rod 187.

The rod 187 is constructed of lightweight, hollow, nested tubular sections 193 which are adapted such that a user standing on a bank 195 can displace the mobile unit 185 toward and away from the bank 195. The sections 193 are dimensioned whereby the lengthwise dimension of the rod 187 can be conveniently transported in a car.

It is to be understood that while certain forms of the present invention have been illustrated and described herein, it is not to be limited to the specific forms or arrangement of parts descried and shown.

What is claimed and desired to be secured by Letters Patent is as follows:

1. A marine object detecting system, comprising:
   (a) a buoyant mobile unit;
   (b) a base unit including a container having:
      (1) a first compartment such that said user controls are mounted therein; and
      (2) a second compartment such that the remainder of said system is storable therein;
   (c) transducer means mounted on said mobile unit;
   (d) communication linkage means for linking said transducer means with said base unit;
   (e) user signaling means for signaling a user; said user signaling means being linked to said transducer means by said communication linkage means and responsive to said signals generated by said transducer means; and
   (f) mobile unit positioning means for positioning said mobile unit.

2. The apparatus according to claim 1, wherein:
   (a) said user signaling means includes fish detection means.

3. The apparatus according to claim 1, wherein:
   (a) said communication linkage means includes a cable having conductors contained in a water-tight sheath.

4. The apparatus according to claim 3, including:
   (a) a swivel for connecting said cable to said mobile unit.

5. The apparatus according to claim 3, wherein:
   (a) said cable is sufficiently buoyant such that said cable generally floats near the surface of the water.

6. The apparatus according to claim 1, wherein:
   (a) said communication linkage means includes a pair of wirelessly communicating transceivers, one disposed in said base unit and the other disposed in said mobile unit.

7. The apparatus according to claim 1, wherein:
   (a) said mobile unit positioning means includes propulsion means for selectively and remotely propelling said mobile unit.

8. The apparatus according to claim 7, wherein:
   (a) said propulsion means include an electric motor disposed on said mobile unit and a propeller connected to said motor.

9. The apparatus according to claim 1, including:
   (a) steering means for selectively and remotely steering said mobile unit.

10. The apparatus according to claim 9, wherein:
    (a) said steering means include an electric motor and a rudder connected to said motor.

11. The apparatus according to claim 10, wherein:
    (a) said electric motor is reversible.

12. The apparatus according to claim 11, including:
    (a) a limit switch such that said rudder has a limited range of movement.

13. The apparatus according to claim 1, wherein:
    (a) said apparatus is portable.

14. A fish locator apparatus for locating fish in a body of water in the vicinity of an user on a bank or in a boat, comprising:
    (a) a floating mobile unit having:
       (1) a transducer;
       (2) a propulsion mechanism comprising a first electric motor and a propeller connected to said first electric motor; and
       (3) a steering mechanism comprising a second electric motor and a rudder connected to said second electric motor;
    (b) a portable base unit having user controls comprising:
       (1) detector controls;
       (2) propulsion controls; and
       (3) steering controls; and
    (c) a single, multi-conductor cable having a waterproof sheath wherein said cable is sufficiently buoyant to generally float near the surface of the water; said cable providing communication between:
       (1) said detector controls and said transducer such that the objects are cooperatively and remotely detectable thereby;
       (2) said propulsion controls and said propulsion mechanism such that said mobile unit is selectively and remotely displacable along a surface of the body of water; and
       (3) said steering controls and said steering mechanism such that said mobile unit is selectively and remotely steerable to starboard and to port as said mobile unit is displaced by said propulsion mechanism.

* * * * *